US010725689B2

(12) United States Patent
Benedict et al.

(10) Patent No.: US 10,725,689 B2
(45) Date of Patent: Jul. 28, 2020

(54) PHYSICAL MEMORY REGION BACKUP OF A VOLATILE MEMORY TO A NON-VOLATILE MEMORY

(71) Applicant: HEWLETT PACKARD ENTERPRISE DEVELOPMENT LP, Houston, TX (US)

(72) Inventors: Melvin K Benedict, Magnolia, TX (US); Eric L Pope, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 17 days.

(21) Appl. No.: 15/752,250

(22) PCT Filed: Aug. 28, 2015

(86) PCT No.: PCT/US2015/047660
§ 371 (c)(1),
(2) Date: Feb. 13, 2018

(87) PCT Pub. No.: WO2017/039598
PCT Pub. Date: Mar. 9, 2017

(65) Prior Publication Data
US 2019/0026026 A1 Jan. 24, 2019

(51) Int. Cl.
*G06F 3/06* (2006.01)
*G06F 12/16* (2006.01)
*G06F 11/14* (2006.01)

(52) U.S. Cl.
CPC .............. *G06F 3/065* (2013.01); *G06F 3/068* (2013.01); *G06F 3/0619* (2013.01);
(Continued)

(58) Field of Classification Search
CPC ...... G06F 3/065; G06F 3/0619; G06F 3/0634; G06F 3/068; G06F 11/14; G06F 11/1441; G06F 12/16
See application file for complete search history.

(56) References Cited

U.S. PATENT DOCUMENTS 5,502,828 A * 3/1996 Shah ................... G06F 12/0846
711/143
7,830,732 B2 11/2010 Moshayedi et al.
(Continued)

OTHER PUBLICATIONS

Narayanan, D. et al, Whole-system Persistence, (Research Paper), Mar. 3-7, 2012, 10 Pages.
(Continued)

*Primary Examiner* — Nanci N Wong
(74) *Attorney, Agent, or Firm* — Park, Vaughn, Fleming & Dowler LLP (57) ABSTRACT

In one example in accordance with the present disclosure, a system for backup of a physical memory region of volatile memory. The system may include: a non-volatile memory, a volatile memory, at least one processor to: execute an application that indicates a virtual memory region stored in the volatile memory, wherein the virtual memory region is associated with an application, determine a corresponding physical memory region of the volatile memory for backup based on the indicated virtual memory region, and at least one memory controller to: receive a backup signal for the physical memory region of the volatile memory, and responsive to receiving the backup signal, backup up the physical memory region of the volatile memory to a memory region of the non-volatile memory.

18 Claims, 5 Drawing Sheets

(52) U.S. Cl.
CPC ............ *G06F 3/0634* (2013.01); *G06F 11/14* (2013.01); *G06F 11/1441* (2013.01); *G06F 12/16* (2013.01)

(56) References Cited

U.S. PATENT DOCUMENTS

| | | | |
|---|---|---|---|
| 8,468,317 B2 | 6/2013 | Steed | |
| 2006/0212727 A1* | 9/2006 | Judge | G06F 1/3203 713/300 |
| 2008/0195875 A1 | 8/2008 | Hobson | |
| 2010/0202238 A1* | 8/2010 | Moshayedi | G06F 11/1658 365/228 |
| 2010/0223498 A1* | 9/2010 | Schlesinger | G06F 11/1438 714/15 |
| 2011/0283083 A1* | 11/2011 | Sartorius | G06F 9/34 711/203 |
| 2012/0117344 A1 | 5/2012 | Kim et al. | |
| 2013/0332660 A1* | 12/2013 | Talagala | G06F 12/0246 711/103 |
| 2014/0129765 A1 | 5/2014 | Cho | |
| 2014/0195480 A1* | 7/2014 | Talagala | G06F 12/0804 707/610 |
| 2014/0297938 A1* | 10/2014 | Puthiyedath | G06F 12/08 711/105 |
| 2014/0325116 A1 | 10/2014 | McKelvie et al. | |
| 2014/0365715 A1 | 12/2014 | Lee | |
| 2015/0003175 A1 | 1/2015 | Ramanujan | |
| 2016/0344834 A1* | 11/2016 | Das | H04L 67/2842 |
| 2017/0061137 A1* | 3/2017 | Rabefarihy | G06F 21/60 |

OTHER PUBLICATIONS

PCT/ISA/KR, International Search Report and Written Opinion, dated May 27, 2016, PCT/US2015/047660, 11 pages.

* cited by examiner

PHYSICAL MEMORY REGION BACKUP OF A VOLATILE MEMORY TO A NON-VOLATILE MEMORY

BACKGROUND

A computing system may include a number of memory modules. These memory modules may serve as system memory, which may store information for running programs and the like. These memory modules may serve also, in some situations, serve as longer term storage, to store information of the system, even after power cycles.

BRIEF DESCRIPTION OF THE DRAWINGS

The following detailed description references the drawings, wherein.

DETAILED DESCRIPTION

A computing system may include at least one volatile memory (i.e., memory cell). Examples of volatile memory include dynamic random access memory (DRAM) or static RAM (SRAM). Volatile memory does not retain data in the event of a power failure or a reboot. Memory modules that include volatile memory as well as non-volatile memory for backup have been under recent development. An example of such a memory module is a so-called NVDIMM (non-volatile dynamic inline memory module). Non-volatile memory retains data in the event of power loss or a reboot. The non-volatile memory may be, for example, flash memory, memristor memory, phase change memory, or the like.

Many applications, such as databases, and various distributed computing frameworks, keep large datasets and/or other state in system RAM, which may generally comprise volatile memory. Within the datasets of these applications, there may exist certain state data. If the state data is stored in volatile memory, this state data may be lost in the event of a power failure. Losing such state data may have severe consequences. For a database application, the database may have to rebuild the database from a previous checkpoint that may not be up-to-date. For some applications, such as file systems, the loss of such state data may result in data corruption or other catastrophic failures.

To address the issue of state data loss, this disclosure describes techniques for backing up state data, which resides in a particular region of a volatile memory, to a region of non-volatile memory. In various examples, the non-volatile memory and the volatile memory may reside on the same memory module, such as an NVDIMM. Various aspects of this disclosure enable fine-grained backup of a virtual memory region that includes such state data. The virtual memory region of memory that includes the state data may correspond to a physical memory region of a volatile memory in various examples.

According to aspects of this disclosure, in the event of a power failure, a memory controller may backup the physical memory region of the volatile memory that includes state data. The memory controller backs up the physical memory region of the volatile memory to a region of non-volatile memory, rather than the entire contents of volatile memory. Because the memory controller backs up the select physical memory region of volatile memory and not the entire volatile memory set, the power that the memory controller uses is substantially less than the power for a full backup. Additionally, the time to complete a partial backup of a physical memory region to a non-volatile memory region may be less than the time to perform a full memory backup, which may be time consuming. For example, backing up one full memory module could take up to 2 minutes, which may use a large amount of backup power.

Performing a "full" backup of volatile memory to non-volatile memory may also result in performance issues and/or unavailability of system memory during a backup operation. For example, to accommodate a "full" memory backup, a memory controller of the system may be prevented from issuing any memory operations on the entire memory bus. In other words, during a memory backup operation, the memory controller relinquishes control of all the memory modules of the system.

Aspects of this disclosure enable a memory controller to perform on-the-fly backup of a physical memory region. Such on-the-fly backup aspects allow a memory controller to periodically backup a physical memory region of memory without having to take the entire computing system offline or halting execution of the program which the memory controller is backing up.

The present disclosure describes examples of backing up a physical memory region of volatile memory to a region of non-volatile memory. To perform a backup, a system in accordance with the present disclosure an application may indicate a region of virtual memory for backup. An operating system or a driver may determine a physical memory region of the volatile memory based on the indicated virtual memory region. A memory controller may receive a backup signal or the physical memory region of the volatile memory. Responsive to receiving the backup signal, the memory controller may backup the physical memory region of the volatile memory to a memory region of the non-volatile memory.

Figure 1:
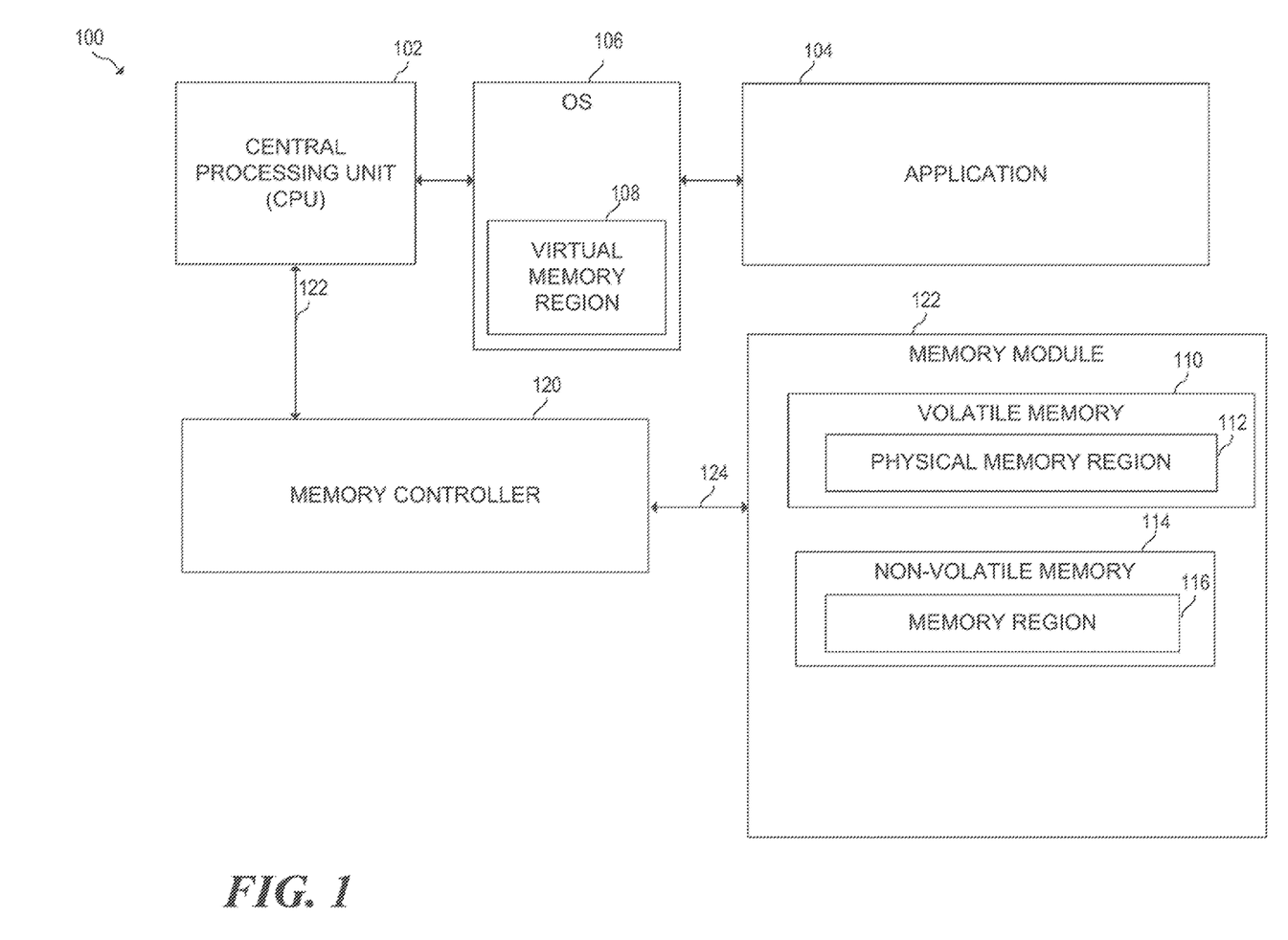
FIG. 1 is a block diagram of an example computing system for physical memory region backup of a volatile memory to a non-volatile memory.

FIG. 1 is a block diagram of an example computing system 100 example for physical memory region backup of a volatile memory to a non-volatile memory. System 100 may be any computing system or computing device capable of using non-volatile memory and volatile memory. System 100 may include at least one central processing unit (CPU) 102, and a memory controller 120.

Memory controller 120 and CPU 102 are illustrated as discrete components in the example of FIG. 1. However, memory controller 120 may be integrated within CPU 102. In the example of FIG. 1, memory controller 120 and CPU 102 may be coupled via a communication bus 122. Memory controller 120 is communicatively coupled with at least one memory module 122 via a memory bus 124. Memory module 122 may comprise a volatile memory 110, and a non-volatile memory 114.

CPU 102 may execute application operating system (OS) 106. OS 106 may comprise an operating system such as Microsoft Windows, Linux, Apple OS X, or the like. OS 106 may manage and perform tasks related to allocation of resources of system 100, such as: memory allocation, disk access, allocation of execution time on CPU 102, multi-tasking, handling of execution modes, networking, user interface, drivers, and/or interrupt handling.

CPU 102 may also execute application 104. As part of the execution of application 104, OS 106 may request a memory allocation for application 104 using memory controller 120. Memory controller 120 allocates a virtual memory region for application 104. The virtual memory region maps to a corresponding physical memory region.

Application 104 may comprise a database, distributed file system, distributed framework, or any other application. Application 104 may include state data. State data may comprise state information or other information relevant to the execution of application 104 in some examples.

OS 106 may receive an indication of and/or a driver may determine a physical memory region 112 of volatile memory module 110 that includes the state data, which memory controller 120 indicates for backup to memory region 116 of non-volatile memory 114. Physical memory region 112 may comprise at least one of: a chip-select, rank, bank, bank group, or row of volatile memory module 110. In some examples, physical memory region 112 may comprise an entire memory module. In some examples, non-volatile memory module 114 may include range registers that indicate an address range corresponding to physical memory region 112. The registers may indicate a starting address and an ending address of physical memory region 116.

In response to an event, OS 106 may generate a backup signal. Memory controller 120 may receive the backup signal from OS 106. For example, OS 106 may detect that a power failure has occurred, and may generate a backup signal, which memory controller 120 receives. In some examples, OS 106 may periodically generate a backup signal for physical memory region 112 corresponding to state data 118. Responsive to receiving the backup signal, memory controller 120 may backup (i.e. store or copy) physical memory region 112 of volatile memory module 110 to memory region 116 of non-volatile memory module 114.

Figure 2:
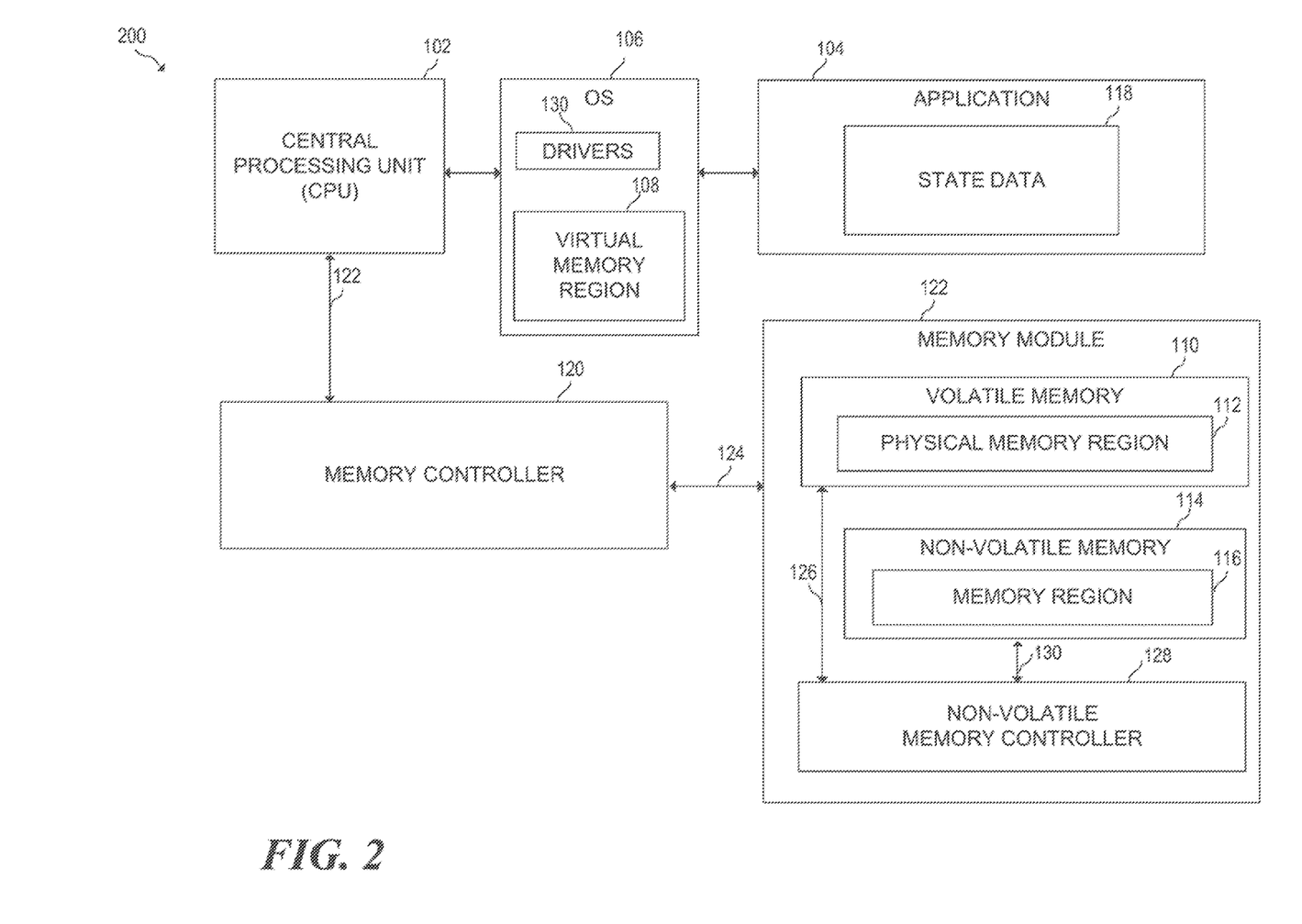
FIG. 2 is a block diagram of an example computing system for physical memory region backup of a volatile memory to a non-volatile memory.

FIG. 2 is a block diagram of an example computing system for physical memory region backup of a volatile memory to a non-volatile memory. FIG. 2 illustrates an example computing system 200. Computing system 200 may be generally similar to computing system 100 of FIG. 1.

Computing system 200 may include additional components, such as drivers 130, and non-volatile memory controller 128. OS 106 may also manage the execution of drivers 130. Drivers 130 may control the interaction among application 104, OS 106, and various devices of system 100, such as CPU 102, memory controller 120, and other devices and peripherals of system 100 not explicitly illustrated in FIG. 1.

Computing system 200 also includes non-volatile memory controller 128. Non-volatile memory controller 128 may be coupled to volatile memory 110 via a communication bus 126. Non-volatile memory controller 128 may also be communicatively coupled to non-volatile memory 114 via a communication bus. In various examples, communication buses 122, 124, 126, and/or 130 may comprise one or more of: a memory bus, peripheral component interconnect express (PCIe) bus, a serial advanced technology attachment (SATA) interface, a serial attached small computer systems interface (SAS), an I2C (inter-integrated circuit) interface, an M.2 interface, or a non-volatile memory express (NVMe) interface.

At some point during the execution of application 104, application 104 may indicate a region of state data to OS 106 or one of drivers 130 associated with OS 106. Application 104 may indicate the state data 118 for example via an operating system application programming interface (API) call. In various examples, the region of state data 118 may comprise a data structure, or a region of virtual memory, e.g. a starting address and an ending address associated with physical memory region 112. In FIG. 2, state data 118 is associated with virtual memory region 108. OS 106 determines virtual memory region 108 via virtual-to-physical memory address translation.

As indicated above, OS 106 may generate a backup signal in response to an event. In some examples, responsive to receiving the backup signal, memory controller 120 may flush buffers associated with physical memory region 112 to memory region 116 of non-volatile memory module 114. CPU 102 may also flush any cache lines corresponding to state data 118 and virtual memory region 108 responsive to receiving the backup signal. Upon completion of the backup operation, memory controller 120 may notify OS 106 that the backup operation has completed.

Responsive to receiving the backup signal, memory controller 120 may indicate that one or more chips banks of volatile memory 110, and corresponding to physical memory region 112 or the like, are "off-line" and therefore unavailable to OS 106 and CPU 102. The process of putting physical memory region 112 off-line may be similar to a process used by memory controller 120 for taking a "hot-pluggable" memory module off-line.

After putting physical memory region 112 off-line, memory controller 120 may clear a data path associated with volatile memory 110 to prepare volatile memory 110 for backup. After clearing the data path, memory controller 120 may flush all buffers associated with physical memory region 112. In some examples, memory controller 120 may be able to perform flushing using per-chip selection. That is, memory controller 120 may be able to signal and flush individual chip(s) of volatile memory 110. In some examples, memory controller 120 may include range registers that OS 106 sets to indicate the range of volatile memory 110 to be flushed. Memory controller 120 may continue the flushing process until the entirety of physical memory region 112 has been flushed.

Upon flushing volatile memory 110, memory controller 120 may put physical memory region 112 as defined by the range registers into self-refresh mode. Self-refresh mode is an operating mode of a dynamic memory, such as DRAM, in which the DRAM refreshes its own memory cells rather than relying on the memory controller to refresh the memory cells. In some examples, memory controller 120 may put a subset of the chips of volatile memory 110 into self-refresh mode.

Responsive to volatile memory controller 110 putting volatile memory module 114 into self-refresh mode, memory controller 120 may initiate a save operation. A save operation as described herein may correspond to a JEDEC-standardized operation in which data from a volatile memory is stored into a non-volatile memory. A memory controller, such as memory controller 120 initiates a save operation by setting the voltage of a SAVE_n signal of memory module 122 to a logical zero.

Responsive to initiating the save operation and determining that SAVE_n has been asserted, non-volatile memory controller 128 may save the data from physical memory region 112 and corresponding to state data 118, to memory region 116 of non-volatile memory 114. The transfer of data from physical memory region 112 to memory region 116 may occur via communication buses 126, and 130. Once non-volatile memory controller 128 completes the backup operation, non-volatile memory controller 128 may put volatile memory 110 back into self-refresh mode, and de-asserts the SAVE_n pin (i.e. sets the pin voltage to a logical one).

Memory controller 120 may detect that the SAVE_n pin has been de-asserted, and takes memory module 122 out of self-refresh mode responsive to detecting the de-assertion of the SAVE_n pin. In various examples, memory controller 120 may signal OS 106 to indicate that the save operation has completed, e.g., via an interrupt. OS 106 may receive the signal indicating that the save operation has completed, and may return physical memory region 112 to operation (i.e. bring physical memory region 112 back online). Once physical memory region 112 is back online, application 104 and OS 106 can normally access physical memory region 112.

Figure 3:
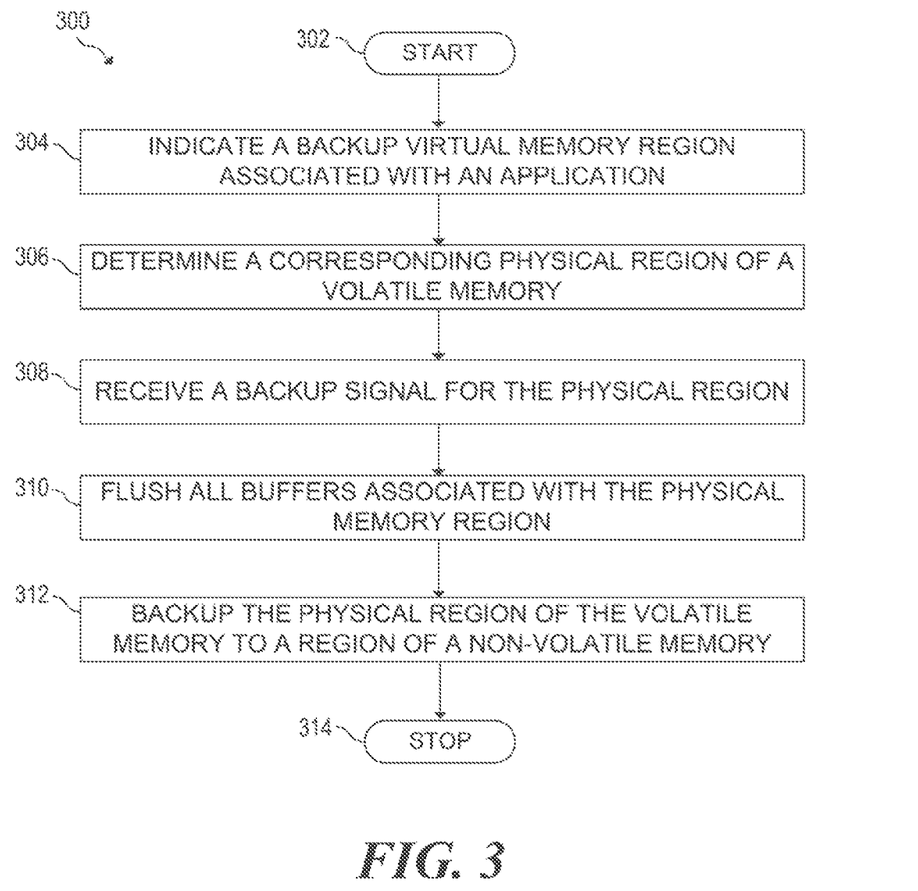
FIG. 3 is a flowchart of an example method for physical memory region backup of a volatile memory to a non-volatile memory.

FIG. 3 is a flowchart of an example method 300 for partial backup during runtime for memory modules with volatile memory and non-volatile memory. Method 200 may be described below as being executed or performed by a system, for example, system 100 of FIG. 1 or system 200 of FIG. 2. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

Method 300 may start at block 302 and continue to block 304, where the system may indicate for backup a virtual memory region associated with an application and stored in a volatile memory. At block 306, the system may determine a corresponding physical memory region of the volatile memory for backup based on the indicated virtual memory region. At block 308, the system may receive a backup signal for the physical memory region of the volatile memory. At block 310, the system may cause the backup to initiate during normal runtime of the system. At block 312, the system may backup the physical memory region of the volatile memory to a memory region of a non-volatile memory. Method 300 may eventually continue to block 314, where method 300 may stop.

Figure 4:
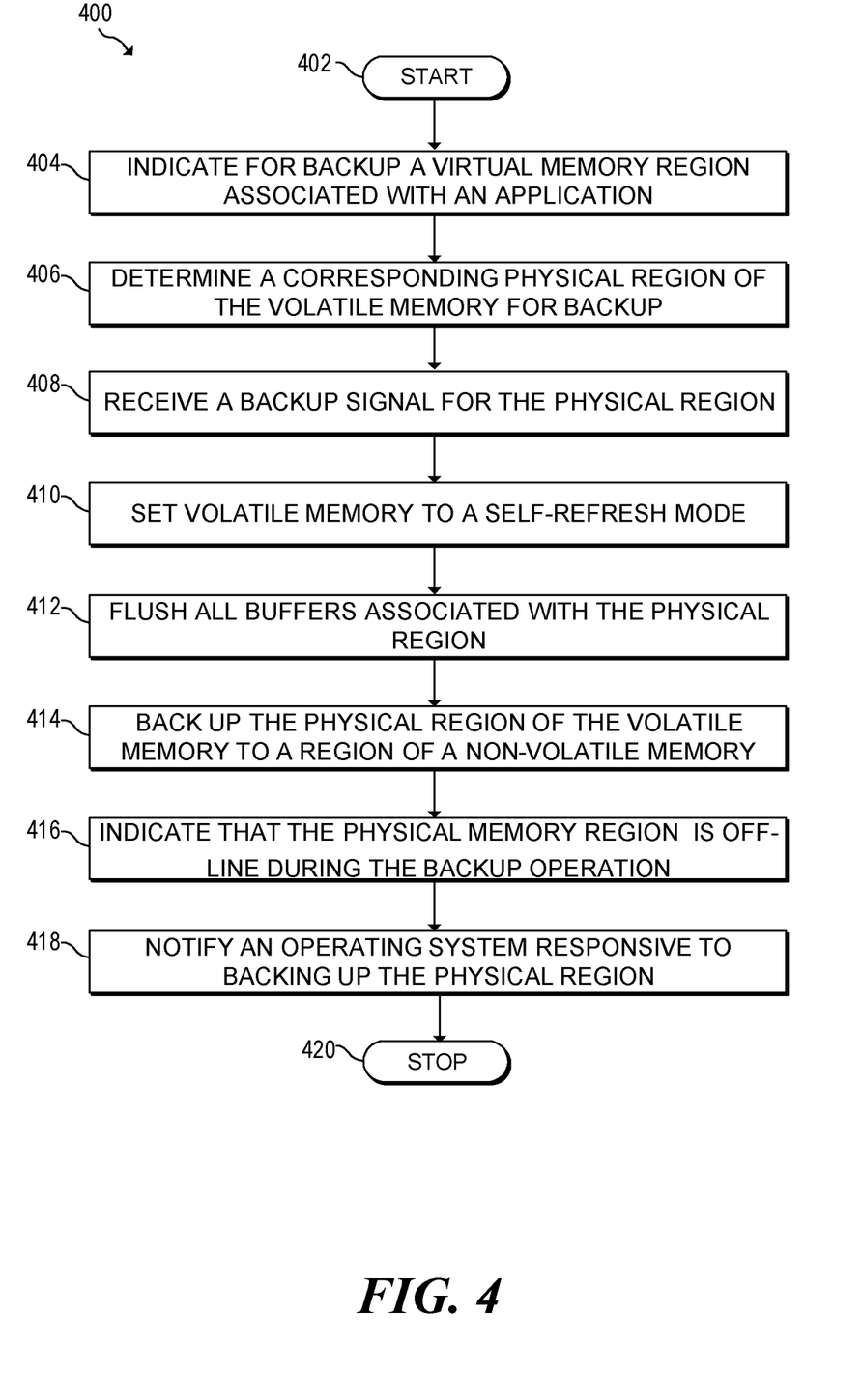
FIG. 4 is a flowchart of an example method for physical memory region backup of a volatile memory to a non-volatile memory.

FIG. 4 is a flowchart of an example method 400 for partial backup during runtime for memory modules with volatile memory and non-volatile memory. Method 400 may be described below as being executed or performed by a system, for example, system 100 of FIG. 1 or system 200 of FIG. 2. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

Method 400 may start at block 402 and continue to block 404, where the system may indicate for backup a virtual memory region associated with an application and stored in a volatile memory (e.g., volatile memory 110 of FIG. 1 or FIG. 2) that a backup should occur in a memory module of the system having a volatile memory and a non-volatile memory (e.g. memory module 122). At block 406, a system 100 or system 200 may determine a corresponding physical memory region of the volatile memory for backup based on the indicated virtual memory region. At block 408, system 100 or system 200 (e.g. memory controller 102) may receive a backup signal for the physical memory region of the volatile memory.

At block 410, and responsive to receiving the backup signal, memory controller 120 may set the volatile memory to a self-refresh mode. At block 412, system 100 or system 200 may flush all buffers associated with the physical memory region. At block 414, system 100 or system 200 may backup the physical memory region of the volatile memory to a memory region of a non-volatile memory. At block 416, system 100 or system 200 may indicate that the physical memory region of the volatile memory is off-line during the backup operation. And at block 418, memory controller 120 may notify an operating system that manages execution of the application responsive to backing up the physical memory region of the volatile memory to the region of the non-volatile memory. Method 400 may then proceed to block 420, where method 400 may end.

Figure 5:
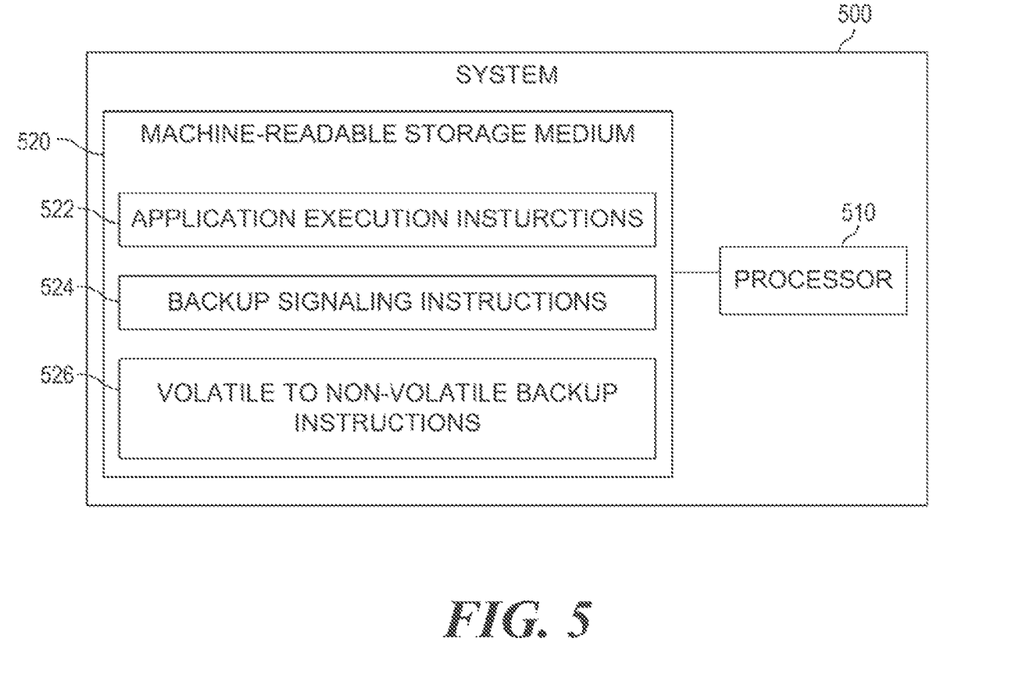
FIG. 5 is a block diagram of an example system for physical memory region backup of a volatile memory to a non-volatile memory.

FIG. 5 is a block diagram of an example system for physical memory region backup of a volatile memory to a non-volatile memory. System 500 may be similar to system 100 of FIG. 1 or system 200 of FIG. 2, for example. In the example of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. In the particular examples shown in FIG. 5, processor 510 may fetch, decode, and execute instructions 522, 524, and 526, to perform backup of a physical memory region of a volatile memory. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for partial backup during runtime for memory modules with volatile memory and non-volatile memory.

Referring to FIG. 5, application execution instructions 522, when executed by a processor (e.g., 510), may cause system 500 to determine that a backup should occur in a memory module of the system having a volatile memory and a non-volatile memory. Application execution instructions 524, when executed by a processor (e.g., 510), may cause system 500 to execute an application that is associated with a physical memory region stored in a volatile memory. Backup signaling instructions 526, when executed by a processor (e.g., 510), may cause system 500 to receive a backup signal for the physical memory region of the volatile memory. Volatile to non-volatile backup instructions 526, when executed by a processor (e.g., 510), may cause system 500 to backup up the physical memory region of the volatile memory to a region of the non-volatile memory responsive to receiving the backup signal. In some examples, system 500 may further comprise machine-readable instructions that, when executed, cause a processor (e.g., 510) to notify an operating system that manages execution of the application responsive to finishing the backup of the physical memory region of the volatile memory.

The invention claimed is:

1. A method comprising:
    indicating for backup a virtual memory region associated with an application, the virtual memory region mapped to a corresponding physical memory region of a volatile memory, the volatile memory including a plurality of physical memory regions;
    determining the corresponding physical memory region from among the plurality of physical memory regions of the volatile memory for backup based on the indicated virtual memory region;
    receiving a backup signal for the corresponding physical memory region of the volatile memory;
    determining, based on physical address ranges respectively associated with the physical memory regions of the volatile memory stored in a plurality of range registers, each physical address range including a starting address and an ending address, a corresponding physical address range associated with the corresponding physical memory region of the volatile memory;
    flushing all buffers associated with the corresponding physical memory region associated with the corresponding physical address range;
    responsive to receiving the backup signal, backing up the corresponding physical memory region associated with the corresponding physical address range of the volatile memory to a memory region of a non-volatile memory;
    setting the volatile memory to a self-refresh mode responsive to backing up the physical memory region of the volatile memory; and
    taking the volatile memory out of the self-refresh mode responsive to completing the backup.

2. The method of claim 1, further comprising:
    indicating that the corresponding physical memory region of the volatile memory is off-line during the backup operation.

3. The method of claim 1, further comprising:
    notifying an operating system that manages execution of the application responsive to backing up the corresponding physical memory region of the volatile memory to the memory region of the non-volatile memory.

4. The method of claim 1, wherein the backup signal is received at least one of periodically and responsive to an event.

5. The method of claim 1, wherein the virtual memory region includes state data.

6. A non-transitory machine-readable storage medium encoded with instructions executable by a processor of a processor to cause the processor to:
    execute an application that is associated with a virtual memory region indicated for backup, the virtual memory region mapped to a corresponding physical memory region of a volatile memory, the volatile memory including a plurality of physical memory regions;
    determine the corresponding physical memory region from among the plurality of physical memory regions of the volatile memory for backup based on the indicated virtual memory region;
    receive a backup signal for the corresponding physical memory region of the volatile memory;
    determine, based on physical address ranges respectively associated with physical memory regions of the volatile memory stored in range registers, each physical address range including a starting address and an ending address, a corresponding physical address range associated with the corresponding physical memory region of the volatile memory;
    responsive to receiving the backup signal, backup up the corresponding physical memory region associated with the corresponding physical address range of the volatile memory to a memory region of the non-volatile memory.

7. The non-transitory machine-readable storage medium of claim 6 further comprising instructions that, when executed, cause the processor of the system to:
    notify an operating system that manages execution of the application responsive to finishing the backup of the corresponding physical memory region of the volatile memory.

8. The non-transitory machine-readable storage medium of claim 6, wherein the backup signal is received at least one of periodically and responsive to an event.

9. The non-transitory machine-readable storage medium of claim 6, wherein the virtual memory region includes state data.

10. A system comprising:
    a non-volatile memory;
    a volatile memory, the volatile memory including a plurality of physical memory regions;
    a plurality of range registers to store physical address ranges respectively associated with the physical memory regions of the volatile memory, each physical address range including a starting address and an ending address;

at least one processor configured to:
  execute an application that is associated with a virtual memory region indicated for backup, the virtual memory region mapped to a corresponding physical memory region of the volatile memory;
  determine the corresponding physical memory region from among the physical memory regions of the volatile memory for backup based on the indicated virtual memory region;

at least one memory controller configured to:
  receive a backup signal for the corresponding physical memory region of the volatile memory;
  determine, based on the physical address ranges respectively associated with the physical memory regions of the volatile memory stored in the range registers, a corresponding physical address range associated with the corresponding physical memory region of the volatile memory; and
  responsive to receiving the backup signal, backup up the corresponding physical memory region associated with the corresponding physical address range of the volatile memory to a memory region of the non-volatile memory; and a non-volatile memory controller configured to set the volatile memory to a self-refresh mode responsive to backing up the physical memory region of the volatile memory;

wherein the memory controller is further configured to take the volatile memory out of the self-refresh mode responsive to completing the backup.

11. The system of claim 10, wherein the memory controller is further to:
  responsive to backing up the corresponding physical memory region of the volatile memory, signal an operating system that the backup has completed.

12. The system of claim 10, wherein at least one of an operating system or a driver executing on the at least one processor determines the corresponding physical memory region of the volatile memory for backup.

13. The system of claim 10, wherein the corresponding physical memory region of the volatile memory comprises at least one of: a memory chip, a row, a bank, or a bank group of the volatile memory.

14. The system of claim 10, wherein the non-volatile memory and the volatile memory comprise a single memory module.

15. The system of claim 14, wherein to backup the corresponding physical memory region of the volatile memory, the memory controller signals the memory module to perform a save operation by asserting a SAVE_n signal of the memory module.

16. The system of claim 10, wherein an operating system executing on the at least one processor periodically generates the backup signal.

17. The system of claim 10, wherein an operating system executing on the at least one processor generates the backup signal responsive to an event.

18. The system of claim 10, wherein the virtual memory region includes state data.

* * * * *